United States Patent [19]

Wiegand et al.

[11] Patent Number: 4,950,398

[45] Date of Patent: Aug. 21, 1990

[54] CANTILEVERED FLIGHT ATTACHMENT FOR NON-METALLIC CHAIN

[75] Inventors: James H. Wiegand, Franklin; Thomas J. Casper, Waukesha, both of Wis.

[73] Assignee: Envirex Inc., Waukesha, Wis.

[21] Appl. No.: 302,137

[22] Filed: Jan. 26, 1989

Related U.S. Application Data

[63] Continuation of Ser. No. 89,001, Aug. 17, 1987, abandoned, which is a continuation of Ser. No. 824,820, Jan. 31, 1986, abandoned.

[51] Int. Cl.$^5$ .............................................. B01D 21/18
[52] U.S. Cl. .................................... 210/232; 210/526; 210/541; 198/731; 198/733
[58] Field of Search ................................ 210/523–527, 210/232, 541, 542; 198/731, 733; 15/93 R

[56] References Cited

U.S. PATENT DOCUMENTS

| | | | |
|---|---|---|---|
| 1,560,716 | 11/1925 | Newdick | 198/731 |
| 3,313,422 | 4/1967 | Swenson | 210/526 |
| 3,394,816 | 7/1968 | Lowry | 210/526 |
| 4,123,947 | 11/1978 | Smith et al. | 74/245 |
| 4,518,077 | 5/1985 | Ronco et al. | 198/731 |
| 4,663,042 | 5/1987 | Rasper et al. | 198/731 |

FOREIGN PATENT DOCUMENTS

| | | | |
|---|---|---|---|
| 593856 | 3/1960 | Canada | 198/731 |
| 288647 | 8/1971 | U.S.S.R. | 198/731 |
| 672191 | 5/1952 | United Kingdom | 198/731 |

OTHER PUBLICATIONS

Rexnord Engineering Chain, "Application Report #112-N348 Polymeric Chain", Bulletin 85-1180-12, Rexnord 1985, Mechanical Power Division.
Rexnord, "Rex Power Transmission and Conveying Components" R85 Catalog, pp. C-12 and C-77.

*Primary Examiner*—W. Gary Jones
*Assistant Examiner*—Matthew Savage
*Attorney, Agent, or Firm*—Michael, Best & Friedrich

[57] ABSTRACT

A flight attachment is provided for a drive chain comprised of a plurality of overlapping links pivotally connected by pins so that stress loads transmitted through the chain by flight are transferred through the chain pivot pins and not through the chain side bars. The flight attachment comprises a pair of flight brackets, one located on each side of a link of the chain and connected to the chain in cantilever fashion by elongate, laterally extending pivot pins. The flight brackets are constructed and arranged to accept a collector flight securely mounted thereon.

10 Claims, 3 Drawing Sheets

CANTILEVERED FLIGHT ATTACHMENT FOR NON-METALLIC CHAIN

This is a continuing application of Ser. No. 07/89001 filed 8/17/87 now abandoned, which was a continuing application of Ser. No. 06/824820 filed 1/31/86 now abandoned.

BACKGROUND OF THE INVENTION

The present invention relates to non-metallic drive chains fitted with specialized attachments designed to perform load-inducing work on a cyclical basis. More specifically, the present invention discloses a stress relieving attachment for chains used in wastewater sedimentation tanks. These chains are equipped with elongate transverse flights which collect and convey settled sludge as well as floating waste to points of ultimate disposal within the tank.

Sludge collector mechanisms are used in the sedimentation tanks of wastewater and potable water treatment plants to scrape the settled sludge from the bottom of the tank and to skim the floating waste material from the surface of the wastewater. Typically, sludge collectors include transverse flights which are carried on a pair of drive chain strands on a circuit along the bottom of the tank as well as along the surface of the water in the tank to accomplish the scraping and skimming functions.

The end regions of collector flights are equipped with means to mount the flights on the drive chains. The drive chains are looped around collector chain sprockets which are mounted on cross shafts, with the sprockets located near the side walls of the tank to minimize shaft deflection.

In conventional applications, the collector flights are mounted to the drive chains by special attachment links, which are uniformly interspaced in each strand of drive chain. The attachment links essentially consist of a normal chain link provided with an upwardly projecting, paddle-faced integral member. This upwardly projecting member provides attachment points for threaded fasteners securing the flight to the chain.

The combined factors of cost, weight and corrosion have created a trend in the wastewater industry to greater use of plastics and other non-metallic materials. Consequently, the most recent developments in drive sprockets, chains, and even collector flights involve the implementation of non-metallic materials.

Recent attempts to design non-metallic flight attachment links have met with marginal success. Problems have arisen because elongate collector flights encounter significant stress loads originating in part from their long, unsupported mid-span area. This mid span area is particularly susceptible to stress loads caused by accumulations of settled solids which must be pushed across the floor of the tank.

These stress loads are transmitted through the ends of the flight to the sidebars of the attachment links via the paddle-faced attachment point. The change in material plane and thickness at the junction of the paddle face and link sidebar results in an inherent stress concentration which renders the attachment link the weak link in the chain strand. The attachment link stress loading is compounded by reason that each attachment link progressing in the direction of chain travel will carry the load imposed by the trailing flights. It is the summation of the flight and chain loadings concentrated at the sidebar stress location that ultimately induces link failure. This is especially critical for chains installed in long settling basins.

Thus there is a definite need for a non-metallic drive chain flight attachment capable of withstanding the significant stress loads encountered by these components when used in wastewater treatment tanks.

It is the main object of the present invention to provide such an attachment.

SUMMARY OF THE INVENTION

The present invention discloses a cantilevered flight attachment for use with non-metallic drive chains. These drive chains are comprised of a plurality of links, pivotally joined in overlapping fashion by rigid pins journalled within a bushing of the leading link and held firmly in the transverse pin bores within each sidebar hub of the trailing link. In practice, transverse pusher or collector flights are mounted at spaced intervals to the chain, which travels in paired relationship in a circuit in a wastewater settling tank. The collector flights are used to collect settled material from the bottom of the tank and floating matter from the surface of the tank. Conventional flight attachment links often crack due to the tremendous stress loads placed thereon by the elongate flights.

More specifically, the flight attachment of the present invention comprises a pair of flight brackets, one bracket mounted in outrigger fashion on each side of a chain link. The brackets comprise an elongate link portion, which is coextensive with the normal chain link, and is attached thereto by means of extra-long pivot pins passing through both the normal links and the flight brackets. The brackets further comprise an upwardly projected flight support portion, which is constructed and arranged to receive a collector flight in securely mounted fashion. Each collector flight is supported at each end by a flight attachment on each of the two drive chains. Stress loads transmitted from the flight to the chain will now pass only through the chain pivot pins in a more evenly distributed manner than was the case with former attachment links, in which flight loads were directed to the inherent stress point of the attachment link sidebar. In addition, the cantilevered attachment design will not be subjected to accumulative loading of trailing flights.

DESCRIPTION OF THE DRAWINGS

The invention and its many attendant objects and advantages will become better understood by reference to the following drawings wherein.

DESCRIPTION OF THE PREFERRED EMBODIMENT

Figure 1:
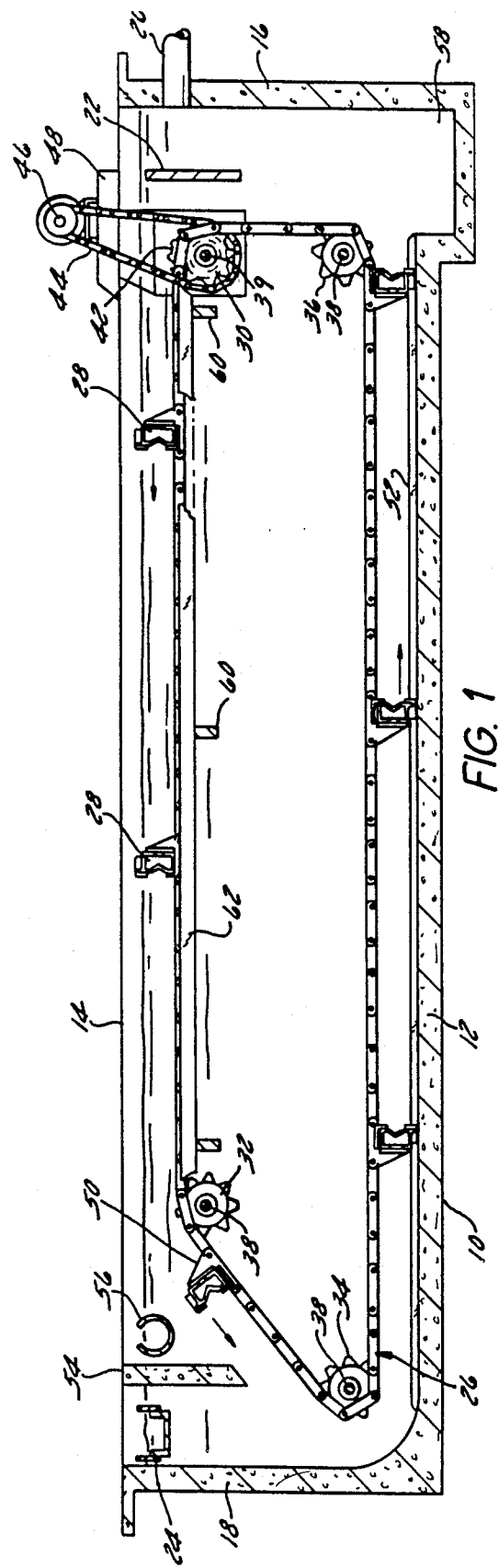
FIG. 1 is a longitudinal sectional view of a settling tank embodying the flight attachment of the present invention.
Figure 2:
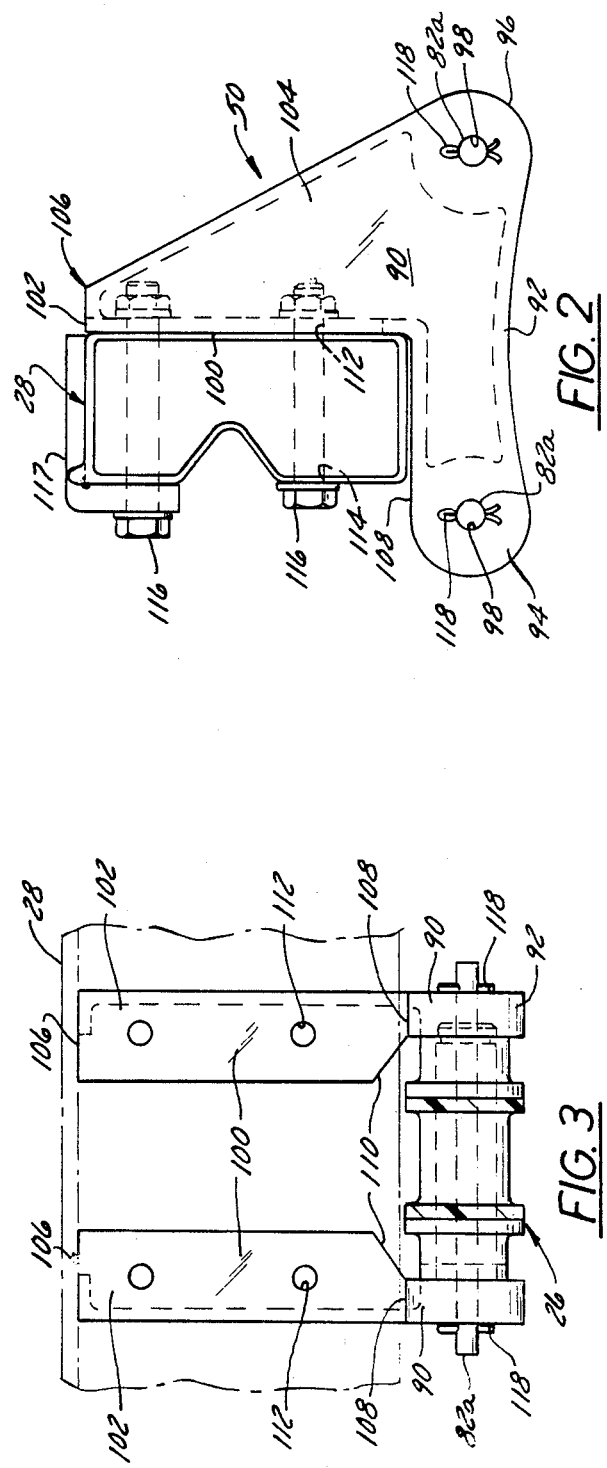
FIG. 2 is a side view of the flight attachment of the present invention having a collector flight mounted thereon.
Figure 3:
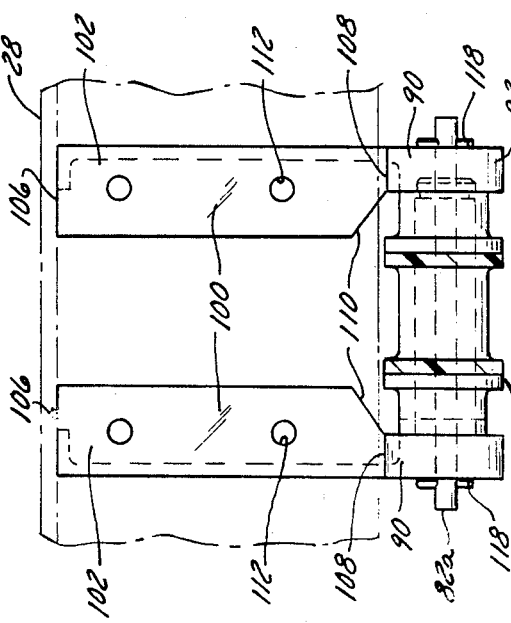
FIG. 3 is a front view of the flight attachment shown in FIG. 2.

Referring now to the drawings wherein like referenced characters designate identical or corresponding parts, FIG. 1 illustrates a primary settling tank 10 which is usually formed of reinforced concrete. The tank 10 comprises a bottom 12, a pair of opposite side walls 14, an influent end wall 16, and an effluent end wall 18. A conduit 20 extends through the influent end wall 16 and delivers the liquid into the tank 10. A baffle 22 extends across the top of the tank 10 and between side walls 14, and extends downwardly in front of and somewhat below conduit 20 to minimize the turbulence created by the influent flow. The wastewater flows steadily through the settling tank 10 from the influent end wall to the effluent end wall 18. One or more box weirs 24 near the effluent wall 18 provide transverse channels for the flow of liquid out of the settling tank 10.

As the liquid flows through the tank, the settleable solids or sludge descend to the bottom 12, and the flotable waste or scum rises to the surface of the liquid. A collector mechanism is located in tank 10 to facilitate the removal of floating and submerged wastes. The collector mechanism includes a pair of endless chains 26, preferably fabricated of polymeric material, each of which is located adjacent to one of the side walls 14. The endless chains 26 preferably serve as the carriers for the transverse collector flights 28. The endless chains 26 are parallel to each other and are trained around pairs of sprockets 30, 32, 34, and 36, all of which have teeth for engaging said chains. Each pair of sprockets 30, 32, 34, and 36 is mounted on one of four transversely extending shafts 38, the ends of which are rotatably mounted in bearings (not shown). The bearings for each shaft are secured to the side walls 14. The shaft 38 for the pair of sprocket wheels 30 has a driving sprocket 42 secured thereto, which is engaged by a driving chain 44 extending downwardly from a power drive unit 46 mounted on a platform 48. Thus, the pair of sprockets 30 drive the endless chains 26. The other pairs of sprockets 32, 34, and 36 engage the endless chains to guide their travel in tank 10. A plurality of transversely extending collector flights 28 are secured to the endless chains 26 at selected sequential positions along the chain. The collector flights 28 are secured to the chains by attachments 50 which are attached at specified points of each chain 26.

In the bottom 12 of tank 10, there are embedded a pair of substantially parallel rails 52, which extend longitudinally in the tank 10 and extend slightly above the bottom 12 of tank 10 to provide tracks for the flights 28 as they are moved along the bottom 12 of tank 10 from the effluent end wall 18 through to the influent end wall 16 to collect settled sludge.

A baffle 54 extends across tank 10 in a position upstream of the effluent end wall 18 and prevents the floating waste from flowing further downstream. Upstream of the baffle 54 and in front of the same there is provided a collecting trough 56 for the floating wastes, and as the latter are skimmed from the surface of the wastewater, they are received in the collecting trough 56 to be discharged from tank 10. Similarly, at the influent end wall 16, there is provided a sludge trough 58 in which the sludge is deposited as it is collected from the tank bottom 12. The sludge is pumped from the sludge trough 58 intermittently or continuously in accordance with the process requirements.

A plurality of brackets 60 are secured to each side wall 14 below the tops of the same and at longitudinally spaced positions along the side wall 14. A rail 62 is secured to the bracket 60 on each side wall 14. The rail 62 extends longitudinally along the side walls and provides tracks for the flights 28 as they are moved along the surface to skim the flotable waste therefrom. The rails 62 are located at such an elevation that the transverse flights 28 are partially submerged in the wastewater as they ride along the rail 62.

Figure 4:
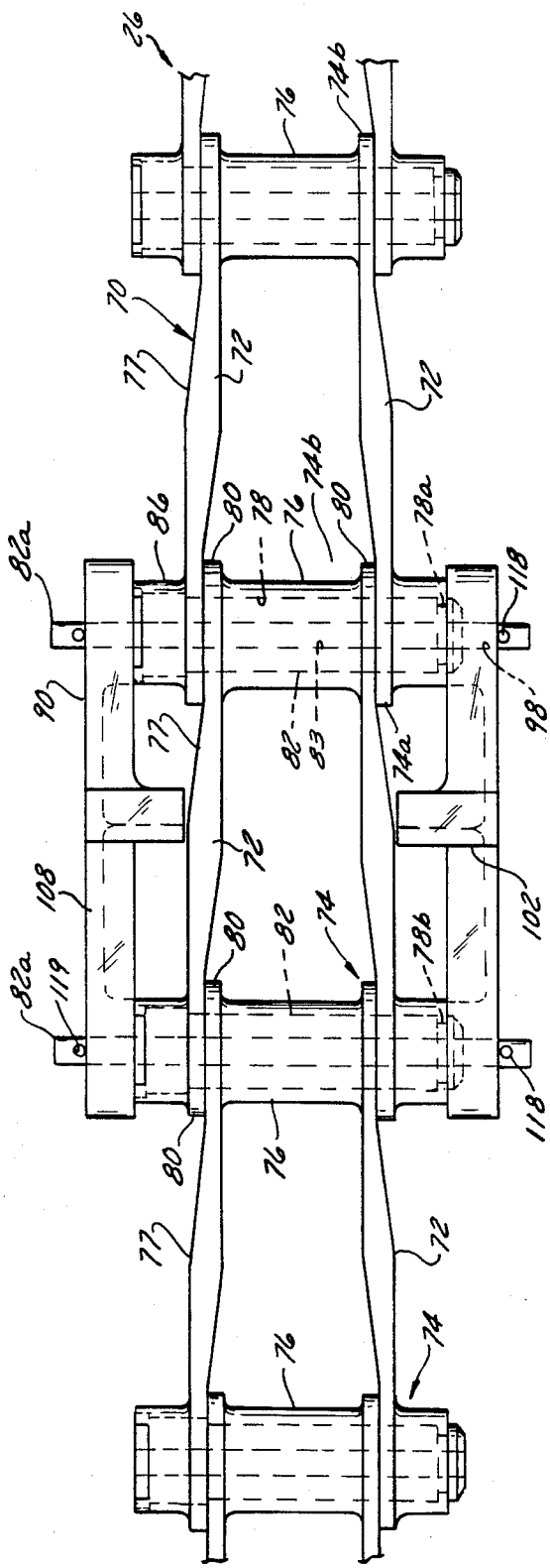
FIG. 4 is a plan view of the flight attachment of the present invention secured to a drive chain.
Figure 5:
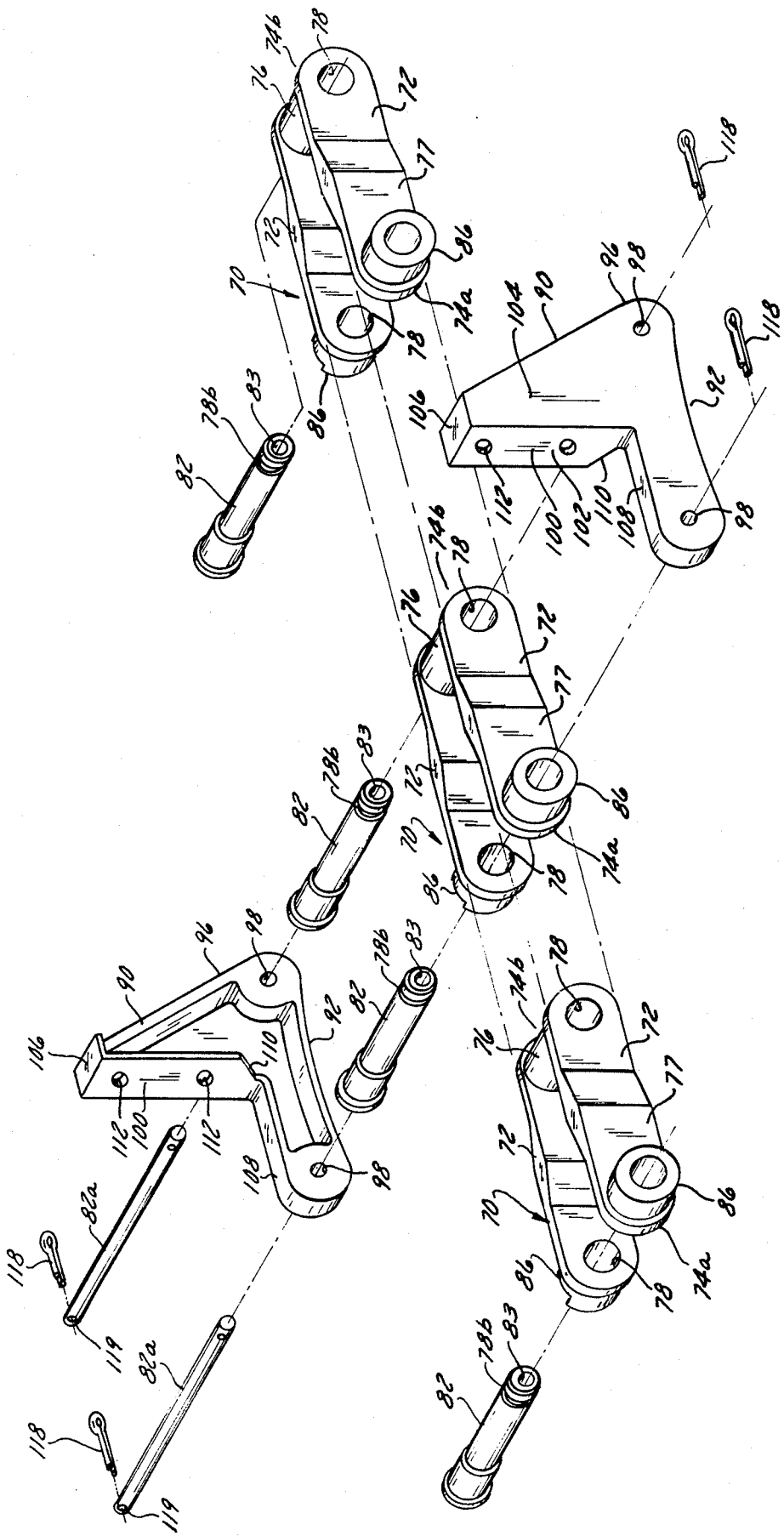
FIG. 5 is an exploded view of the flight attachment depicted in FIG. 2.

Referring now to FIGS. 4 and 5, the preferred polymeric chain of the present invention is depicted, although any suitable polymeric chain configuration may be used. The polymeric drive chain 26 is comprised of a plurality of links 70. Each link 70 is comprised of a pair of laterally flattened sidebars 72 positioned in a substantially parallel arrangement. Links are molded of an engineering grade polymer material such as acetal, polyester or nylon resin. Each link is further comprised of a pair of link ends 74, which provide the attachment points for adjacent links 70.

Each link end 74 is comprised of a hollow polymeric spacer bushing 76, a transverse pin bore 78 in each end 80 of each sidebar 72, and a polymeric pin 82. The pin 82 is constructed and arranged to pass through the pin bores 78 and the sidebars 72 of two adjacent links 70, as well as the hollow bushing 76. In the present invention, hollow polymeric pins are shown. These pins are fabricated of high strength material such as glass reinforced nylon, polyester or acetal resins and may be hollowed to minimize the amount of material and save costs.

When pins 82 are hollowed, an axial bore 83 is created therein. Pin retention is accomplished by a variety of means such as intergal twist lock lugs or wedge bars, or by independent keeper pins. In the preferred embodiment, a snap ring 78a molded intergally with the transverse pin bore 78 engages a molded circumferential groove 78b in pin 82 to prevent the pins 82 from becoming detached from link ends 74.

In the preferred embodiment, chain 26 is shown having an offset configuration, in which each side bar 72 is angled so that one link end 74a fits outside the link end of the adjacent link, and the other link end 74b fits inside the link end 74a of the next adjacent link. The outer facing portion 77 of link end 74a is fitted with an outwardly laterally projecting hub portion 86 with traversing pin bore 78 to support chain pin 82.

As was mentioned earlier, a plurality of collector flights 28 are located at spaced intervals in transverse arrangement to the pair of drive chains 26, one located proximate to each side wall 14 of tank 10. In conventional settling tanks which utilize polymeric chain, the collector flights 28 are secured to chain 26 by special attachment links which replace a standard link. Thus, there are two attachment links for each collector flight 28. Since the attachment links must perform the function of flight support as well as normal power transmission, they are subject to significant stress loading. It has been observed that polymeric collector flight chains are quite susceptible to stress failure in the area of sidebar 72. Consequently, efforts were undertaken to reduce the stress transferred to the attachment links.

Referring now to FIGS. 2-5, the cantilevered attachment 50 of the present invention is shown, comprised of a pair of flight brackets 90. Each flight bracket 90 is comprised of a link portion 92 having a forward end 94, a rear end 96 and a pin bore 98 extending transversely therethrough at each end. Link portion 92 is constructed and arranged to be coextensive with the sidebar 72 of one link of chain 26.

Each flight bracket 90 is further comprised of an upwardly extending flight support portion 100 which is integrally joined to the link portion 92. The flight support portion 100 is comprised of a forward facing paddle face 102 and a reinforcing portion 104. In the preferred embodiment, the reinforcing portion 104 is inclined toward the rear end 96 of the link portion 92 to save material, although it may be designed to have any one of a number of configurations and still not depart from the spirit of the invention.

Forward-facing paddle face 102 extends from the top 106 of bracket 90 to the top 108 of link portion 92. In the preferred embodiment, the inner margin 110 of paddle face 102 drastically tapers near the top 108 of link portion 92 so that the brackets 90 may be attached in close proximity to the chain links described above. Paddle face 102 is also fitted with at least one and preferably two mounting apertures 112. The collector flight 28 is also provided with mounting apertures 114 which correspond to mounting apertures 112. The collector flight 28 is secured to paddle face 102 by means of threaded fasteners 116 passing through mounting holes 112 and 114.

Flight attachment 50 is molded of an engineering grade polymer material such as acetal, polyester or nylon resin.

The flight attachment 50 of the present invention is secured to chain 26 in the following manner. First, the pins 82 of a standard chain link selected for flight attachment location are replaced with extended length chain pins 82a. In the present invention, where hollow, standard length pins are used, the pins 82a may take the form of elongate inserts placed in the central bore 83 of pin 82. In either case, the elongate pins 82a need to be long enough to accommodate the normal chain width, the widths of two attachment brackets 90 and allow sufficient length for the attachment of securing means, such as, but not limited to, a cotter pin 118 and pin aperture 119.

After the pins 82 are replaced, an attachment bracket 90 is placed in outrigger or cantilever fashion on either side of the chain 26, with the paddle faces 102 facing the direction of chain travel. The brackets 90 are positioned so that pins 82a pass through pin bores 98. The flight attachment mounting holes 98 are designed to transmit the flight load to the lead extended pin 82a with the trailing extended pin 82a serving as a retainer to prevent the flight from rotating around the lead pin. This arrangement will also insure that chain load will not be transmitted through the sidebar portion 92 of attachment bracket 90 when chain stretches due to normal anticipated creep or chain joint wear.

Once the attachment brackets 90 are in place, they are affixed to pins 82a by securing means such as cotter pins 118. A collector flight 28 is then placed transversely to the direction of travel of the two chains 26, and is positioned into the 'L' formed by paddle face 102 and of the top 108 of link portion 92. Nominal clearance is provided between the lower margin of flight 28 and the top 108 of link portion 92 to compensate for manufacturing tolerances. The flight 28 is then secured to paddle face 102 by threaded fasteners 116 passing through mounting holes 112 and 114. Usually, flight 28 is provided with polymeric wear shoes 117 to retard abrasion caused by the tank floor 12.

In this form, the flight attachment of the present invention is capable of transmitting stress forces encountered by flight 28 and through pins 82a instead of through chain side bar 72.

While particular embodiments of the cantilevered flight attachment bracket assembly have been shown and described, it will be obvious to persons skilled in the art that changes and modifications might be made without departing from the invention in its broader aspects.

What is claimed is:

1. A collector flight attachment for securing a collector flight to a non-metallic chain, the non-metallic chain being supported by sprockets for cyclical operation and being comprised of a plurality of adjacent chain links, each of said chain links including a pair of sidebars and said adjacent chain links being joined by chain pins extending through the pairs of sidebars of said adjacent chain links from one side of the chain links to the opposite sides of the chain links, the chain pins each having a central longitudinally extending bore, the collector flight attachment securing the collector flight to the non-metallic chain so that stress loading from the collector flight is directed through the pins, not through the sidebars, the collector flight attachment for securing a collector flight to a non-metallic chain comprising:

a pair of elongated polymeric flight brackets, one of the flight brackets being positioned on one side of a chain link adjacent to one of the pair of sidebars of the chain link and said one of said flight brackets having opposite ends positioned adjacent the opposite ends of said one of the sidebars, each of said opposite ends of said one of said flight brackets including a bore, and the other of the flight brackets being positioned on an opposite side of the said chain link and adjacent to the other of the pair of sidebars of that chain link, and said other of said flight brackets having opposite ends positioned adjacent to the opposite ends of the other of the pair of sidebars, each of said opposite ends of said other of said pair of sidebars including a bore, and said polymeric flight brackets each including a projecting collector flight support portion having a mounting surface for supporting the collector flight in suspended fashion with respect to the chain, the mounting surface being vertically elongated and having two lateral sides, and a pair of extended length mounting pins each having opposite ends, one of said extended length mounting pins being housed in the central longitudinally extending bore in a first chain pin at one end of the chain link and with one of said opposite ends of the extended length mounting pin being housed in the bore in one end of one of the polymeric flight brackets and with the other of the opposite ends of the extended length mounting pin being housed in the bore in one end of the other of the polymeric flight brackets on an opposite side of the chain, the other of the extended length mounting pins being housed in the central longitudinally extending bore in a second chain pin at an opposite end of the chain link and with one of the opposite ends of the other extended length mounting pin being housed in the bore in the opposite end of said one of the polymeric flight brackets and with the other of the opposite ends of the other extended length mounting pin being housed in the bore in the opposite end of said other of the polymeric flight brackets on the opposite side of the chain link.

2. A collector flight attachment as set forth in claim 1 and further including means on said elongated polymeric flight brackets for attaching the collector flights to said elongated polymeric flight brackets, said means for attaching including mounting bores provided in said collector flight support portion, and a plurality of threaded fasteners housed in said mounting bores to secure the collector flight to the collector flight support surface portion.

3. A collector flight attachment as set forth in claim 1 wherein each of said projecting collector flight support portions includes an integral reinforcing portion.

4. A collector flight attachment as set forth in claim 3 wherein said reinforcing portion is inclinded.

5. A polymeric collector flight attachment arrangement for a drive chain made up of a plurality of non-metallic links, each of said plurality of non-metallic links comprising a pair of sidebars, each of said sidebars having opposite ends, one end of one of the sidebars being joined by a polymeric spacer bushing to the one end of the other of the sidebars, and the other of the ends of the sidebars overlapping said one of the ends of the sidebars of an adjacent one of said plurality of non-metallic chain links and being connected to said one of the ends of the sidebars of an adjacent one of said plurality of chain links by a chain pin extending transveresely to the direction of chain travel and connecting the chain links for pivoting movement, the chain pin including a central longitudinally extending bore, said polymeric collector flight attachment arrangement comprising:

a pair of elongated polymeric flight brackets, one of the flight brackets being positioned on one side of a chain link adjacent to one of the pairs of sidebars of the chain link and the one of the flight brackets having opposite ends positioned adjacent the opposite ends of said one of the sidebars, and the other of the flight brackets being positioned on an opposite side of said chain link and adjacent to the other of the pair of sidebars of that chain link and the other of the flight brackets having opposite ends positioned adjacent to the opposite ends of the other of the pair of sidebars, said elongated polymeric flight brackets being positioned on opposite sides of said chain link, the opposite ends of the polymeric flight brackets including bores, and said polymeric flight brackets each including a projecting collector flight support portion having a forward-facing mounting surface for supporting the collector flight in suspended fashion with respect to the chain, the mounting surface being vertically elongated and having two lateral sides, and a pair of extended length mounting pins each having opposite ends, one of said extended length mounting pins being housed in the central longitudinally extending bore in a first chain pin at one end of the chain link and with one of said opposite ends of the extended length mounting pin being housed in a bore in one end of one of the polymeric flight brackets and with the other of the opposite ends of the extended length mounting pin being housed in a bore in one end of the other of the polymeric flight brackets on an opposite side of the chain, the other of the extended length mounting pins being housed in the central longitudinally extending bore in a second chain pin at an opposite end of the chain link and with one of the opposite ends of the other extended length mounting pin being housed in a bore in the opposite end of said one of the polymeric flight brackets and with the other of the opposite ends of the other extended length mounting pin being housed in a bore in the opposite end of said another of the polymeric flight brackets on the opposite side of the chain link.

6. A non-metallic chain supported by sprockets for cyclical operation, the non-metallic chain comprising:

a plurality of adjacent chain links, each of said chain links including a pair of sidebars;

chain pins extending through the pairs of sidebars of said adjacent chain links from one side of the chain links to the opposite sides of the chain links to join adjacent chain links together, the chain pins each having a central longitudinally extending bore; and a collector flight attachment for securing a collector flight to the non-metallic chain so that stress loading from the collector flight is directed through the chain pins, not through the sidebars of said chain links, the collector flight attachment including a pair of elongated polymeric flight brackets, one of the flight brackets being positioned on one side of a chain link adjacent to one of the pair of sidebars of the chain link and having opposite ends adjacent the opposite ends of said one of the sidebars, and the other of the flight brackets being positioned on an opposite side of said chain link and adjacent to the other of the pair of sidebars of that chain link and having opposite ends adjacent to the opposite ends of the other of the pair of sidebars, and the opposite ends of the polymeric flight brackets including bores and said polymeric flight brackets each including a projecting collector flight support portion having a forward-facing mounting surface for supporting the collector flight in suspended fashion with respect to the chain, the mounting surface being vertically elongated and having two lateral sides, and a pair of extended length mounting pins each having opposite ends, one of said extended length mounting pins being housed in the central longitudinally extending bore in a first pin at one end of the chain link and with one of said opposite ends of the extended length mounting pin being housed in a bore in the end of one of the polymeric flight brackets and with the other of the opposite ends of the extended length mounting pin being housed in a bore in one end of the other of the polymeric flight brackets on an opposite side of the chain, the other of the extended length mounting pins being housed in the central longitudinally extending bore in a second pin at an opposite end of the chain link and with one of the opposite ends of the other extended length mounting pin being housed in a bore in the opposite end of said one of the polymeric flight brackets and with the other of the opposite ends of the other extended length mounting pin being housed in a bore in the opposite end of said other of the polymeric flight brackets on the opposite side of the chain link.

7. A non-metallic chain as set forth in claim 6 and further including means on said elongated polymeric flight brackets for attaching the collector flights to said elongated polymeric flight brackets, said means for attaching including mounting bores provided in said collector flight support portion, and a plurality of threaded fasteners housed in said mounting bores to secure the collector flight to the collector flight support surface portion.

8. A non-metallic chain as set forth in claim 6 wherein each of said projecting collector flight support portions includes an integral reinforcing portion.

9. A non-metallic chain as set forth in claim 6 wherein said reinforcing portion is inclined.

10. A non-metallic chain supported by sprockets for cyclical operation, the non-metallic chain comprising:
a plurality of adjacent chain links, each of said chain links including a pair of sidebars;
extended length chain pins extending through the pairs of sidebars of said adjacent chain links from one side of the chain links to the opposite sides of the chain links to join adjacent chain links together, the extended length chain pins each having opposite extended ends extending outwardly of the chain links; and
a collector flight attachment for securing a collector flight to the non-metallic chain so that stress loading from the collector flight is directed through the chain pins, not through the sidebars of said chain links, the collector flight attachment including
a pair of elongated polymeric flight brackets, one of the flight brackets being positioned on one side of a chain link adjacent to one of the pair of sidebars of the chain link and having opposite ends adjacent the opposite ends of said one of the sidebars, and the other of the flight brackets being positioned on an opposite side of said chain link and adjacent to the other of the pair of sidebars of that chain link and having opposite ends adjacent to the opposite ends of the other of the pair of sidebars, and the opposite ends of the polymeric flight brackets including bores and said polymeric flight brackets each including a projecting collector flight support portion having a mounting surface for supporting the collector flight in suspended fashion with respect to the chain, one of the opposite ends of one of the extended length mounting pins being housed in a bore in the end of one of the polymeric flight brackets, the other of the opposite ends of the one of the extended length mounting pins being housed in a bore in one end of the other of the polymeric flight brackets on an opposite side of the chain, one of the opposite ends of another extended length mounting pin being housed in a bore in the opposite end of said one of the polymeric flight brackets and with the other of the opposite ends of said another extended length mounting pin being housed in a bore in the opposite end of said other of the polymeric flight brackets on the opposite side of the chain link.

* * * * *